United States Patent
Battey et al.

(10) Patent No.: US 6,560,394 B1
(45) Date of Patent: May 6, 2003

(54) FIBER MANAGEMENT FRAME FOR CLOSURE

(75) Inventors: Jennifer A. Battey, Euless, TX (US); Steve A. Fontaine, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 161 days.

(21) Appl. No.: 09/715,585

(22) Filed: Nov. 17, 2000

(51) Int. Cl.$^7$ .................................................. G02B 6/00
(52) U.S. Cl. ........................................ 385/135; 385/137
(58) Field of Search ................................. 385/134–137, 385/147

(56) References Cited

U.S. PATENT DOCUMENTS

| | | | | |
|---|---|---|---|---|
| 5,546,495 A | * | 8/1996 | Bruckner et al. | 385/135 |
| 6,226,434 B1 | * | 5/2001 | Koshiyama et al. | 385/134 |
| 6,385,381 B1 | * | 5/2002 | Janus et al. | 385/135 |
| 6,434,313 B1 | * | 8/2002 | Clapp, Jr. et al. | 385/135 |
| 6,483,977 B2 | * | 11/2002 | Battey et al. | 385/135 |

* cited by examiner

Primary Examiner—Lynn D. Feild
Assistant Examiner—Son V. Nguyen
(74) Attorney, Agent, or Firm—Christopher C. Dremann

(57) ABSTRACT

A fiber management frame and a closure are provided that are adapted to be utilized in a universal manner for both FTTH and FTTC applications. The closure includes a housing and the fiber management frame disposed within the housing. The fiber management frame includes a back panel attached to the housing and four separate compartments for routing optical fibers and, in FTTC applications, electrical conductors. In FTTH applications, the first compartment receives express optical fibers of the fiber optic feeder cable, while in FTTC applications, the first compartment receives at least one electrical conductor of the electrical feeder cable. The second compartment is proximate the first compartment. In FTTH applications, the second compartment stores at least one coupler tray that splits a first optical fiber of the fiber optic feeder cable into a plurality of second optical fibers. In FTTC applications, the second compartment receives express optical fibers of the fiber optic feeder cable. The third compartment extends in a lengthwise direction alongside the second compartment and stores slack lengths of the optical fibers of the drop cable. The fourth compartment is proximate the third compartment and is adapted to store at least one of a splice tray or a connector panel, or both. The fourth compartment interconnects an optical fiber of the fiber optic feeder cable, such as one of the second optical fibers provided by the coupler tray, to a respective optical fiber of a drop cable.

19 Claims, 5 Drawing Sheets

FIBER MANAGEMENT FRAME FOR CLOSURE

FIELD OF THE INVENTION

The present invention relates generally to fiber optic closures and, more particularly, to closures having an internal frame for appropriately organizing and routing optical fibers and/or electrical connectors within the closure.

BACKGROUND OF THE INVENTION

Fiber optic networks typically include closures at various splice locations throughout the fiber optic network. Typically, these closures include splice closures, patch closures and the like. For example, splice closures commonly house the splices required to connect the optical fibers of one or more fiber optic feeder cables to. respective ones of the optical fibers of a fiber optic drop cable. By housing the splices, a splice closure protects the spliced end portions of the optical fibers from environmental degradation, strain and other deleterious forces, thereby increasing the reliability and quality of the splices.

While fiber optic networks have traditionally served as the backbone or trunkline of communication networks so as to transmit signals over relatively long distances, fiber optic networks are gradually being extended closer to the end points of the communications networks. In this regard, fiber optic networks have been developed that deliver fiber-to-the-curb (FTTC), fiber-to-the-home (FTTH); fiber-to-the-desk and the. like. In each of these different applications, a splice closure must be capable of splicing different types of cables in order to establish the proper interconnections. In this regard, the splice closure utilized in a FTTH application is adapted to interconnect a fiber optic feeder cable and one or more fiber optic drop cables so as to permit at least some of the optical fibers of the feeder cable to extend uninterrupted through the splice closure while splicing or otherwise connecting the other optical fibers of the fiber optic feeder cable with optical fibers of the one or more drop cables. In contrast, a splice closure that is utilized in a FTTC application is adapted to interconnect not just a fiber optic feeder cable and one or more drop cables, but also an electrical feeder cable. In the FTTC application, the splice closure must facilitate the splicing of one or more electrical conductors of the electrical feeder cable to corresponding electrical conductors of the one or more drop cables, while permnitting the remainder of the electrical conductors of the electrical feeder cable to extend uninterrupted through the closure. Additionally, the splice closure must facilitate the splicing of one or more of the optical fibers of the fiber optic feeder cable with respective optical fibers of the one or more drop cables while continuing to permit at least some of the optical fibers of the fiber optic feeder cable to extend uninterrupted through the splice closure.

Currently, different types of splice closures are provided for FTTH and FTTC applications. While effective for providing the necessary splice.connections, both types of splice closures must be manufactured and maintained in stock. In addition, field technicians must be trained to install and service each type of splice closure.

Within either type of splice closure, that is, a splice closure for a FTTH application or a splice closure for a FTTC application, it is oftentimes relatively difficult to separate the express optical fibers that extend uninterrupted through the splice closure from the optical fibers that are spliced to the optical fibers.of the drop cables. In this regard, the express optical fibers and the optical fibers that are spliced to the drop cables are oftentimes routed and stored in a common manner. Therefore, in instances in which the splice closure must be reconfigured so as to provide additional or different splice connections, it may be relatively difficult and time consuming to separate the express optical fibers and the optical fibers of the drop cables to identify the particular optical fibers which must now be interconnected.

In addition to identifying respective ones of the optical fibers, a field technician must generally access the splice tray or connector panel in order to change the interconnections between the optical fibers or to add additional interconnections between the optical fibers. Unfortunately, however, the field technician must oftentimes access or otherwise work with other portions of the splice closure in order to obtain access to the splice tray or connector panel or to identify the optical fibers to be interconnected. While the field technician will likely be quite familiar with the organization of the splice tray or connector panel, the technician may be much less familiar with the other portions of the splice closure. As such, the other portions of the splice closure may be inadvertently damaged during the process of accessing the splice tray or connector panel, or in the process of identifying the optical fibers to be interconnected. Moreover, even if a field technician is careful not to damage other portions of the splice closure, the technician will typically require more time to access the splice tray or connector panel and make the appropriate interconnections in those instances in which the technician must first access or otherwise work with other portions of the splice closure.

As such, while splice closures have been developed for various applications including FTTH and FTTC applications, it would still be desirable to develop a splice closure that could be installed, service and reconfigured in a more efficient manner. In this regard, it would be desirable to have a splice closure that is universally adapted for use in both FTTH and FTTC applications to reduce the number of different types of splice closures that must be manufactured and maintained in stock and to reduce the number of splice closures with which a field technician must be familiar. Moreover, it would be desirable to develop a well organized splice closure in which the express optical fibers and the optical fibers that are spliced to the optical fibers of the drop cables, as well as any electrical conductors, are separately routed and stored in order to facilitate subsequent reconfiguration of the spice closure in a manner that is efficient and is relatively straight-forward for the technician, and thereby avoid inadvertent damage to other portions of the splice closure.

SUMMARY OF THE INVENTION

A fiber management frame and a closure including the fiber management frame are provided that are adapted to be utilized in a universal manner for both FTTH and FTTC applications. Moreover, the fiber management frame of the present invention is designed to separately route and store express optical fibers that extend uninterrupted through the closure and optical fibers that are to be spliced to optical fibers of one or more drop cables and, in FTTC applications, electrical conductors of an electrical feeder cable that are to be connected to electrical conductors of one or more composite drop cables. As such, the fiber management frame and the associated closure of the present invention will facilitate installation and service, as well as any subsequent reconfiguration of the closure.

According to one aspect of the present invention, a closure is provided that includes a housing defining a lengthwise extending internal cavity and further defining a plurality of ports opening into the internal cavity for receiving a plurality of feeder and drop cables. Typically, the housing defines ports for receiving a fiber optic feeder cable and at least one drop cable and, in FTTC applications, an additional port for receiving an electrical feeder cable. The closure also includes a fiber management frame disposed within the internal cavity defined by the housing. The fiber management frame includes a back panel attached to the housing and four separate compartments for appropriately separating and routing optical fibers and, in FTTC applications, electrical conductors.

In this regard, the first compartment preferably includes a partition that extends both outwardly from the back panel and in a lengthwise direction. The first compartment therefore extends lengthwise from a first open end to a second open end. In one aspect of the present invention, such as in FTTH applications, the first compartment receives express optical fibers of the fiber optic feeder cable that extend uninterrupted through the closure. In another aspect of the present invention, such as in FTTC applications, the first compartment is adapted to receive at least one electrical conductor of the electrical feeder cable. In either instance, the first compartment of the fiber management frame may include a cover to protect the express optical fibers or the electrical conductors extending therethrough. The first compartment may also include an angled ramp projecting outwardly from at least one end thereof as well as at least one upturned flange on an edge of the partition opposite the back panel to guide the express optical fibers or the electrical conductors into and to maintain them within the first compartment.

The second compartment is proximate the first compartment and preferably includes a partition that is spaced apart from the partition of the first compartment. Like the partition of the first compartment, the partition of the second compartment extends both outwardly from the back panel and in a lengthwise direction. In addition, the compartment defines at least a first open end. In one aspect of the present invention, such as in FTTH applications, the second compartment stores at least one coupler tray that is adapted to split a first optical fiber of the fiber optic feeder cable into a plurality of second optical fibers. As such, the second compartment may include an engagement member for engaging the at least one coupler tray. Moreover, the partition of the first compartment may define an opening to facilitate access to the second compartment and, more particularly, to the at least one coupler tray stored within the second compartment. According to another aspect of the present invention, such as in FTTC applications, the second compartment is adapted to receive express optical fibers of the fiber optic feeder cable that extend uninterrupted through the closure. The second compartment may also include at least one upturned flange on an edge of the partition opposite the back panel.

The third compartment of the fiber management frame also preferably extends in a lengthwise direction alongside the second compartment from a first open end to a second open end. The third compartment is adapted to store slack lengths of the second optical fibers and/or slack lengths of the optical fibers of the drop cables. In one embodiment, the third compartment therefore includes a plurality of retainers attached to the partition of the second compartment for retaining slack lengths of the second optical fibers and/or optical fibers of the drop cables.

The fourth compartment is proximate the third compartment and preferably comprises a partition that is spaced apart from the partitions of the first and second compartments and that extends both outwardly from the back panel and in the lengthwise direction. Additionally, the fourth compartment defines at least a first open end through which optical fibers may enter and exit. The fourth compartment is adapted to store at least one of either a splice tray or a connector panel, or both. In either instance, the fourth compartment is adapted to interconnect an optical fiber of the fiber optic feeder cable, such as one of the second optical fibers provided by the coupler tray, to a respective optical fiber of a drop cable.

The fiber management frame, as well as a closure incorporating the fiber management frame, may be utilized in a variety of applications, including both FTTH and FTTC applications, thereby reducing the number of different types of closures that must be manufactured and maintained in stock and similarly reducing the number of different closures with which a field technician must be familiar. Additionally, the fiber management frame of the present invention provides for separate routing and storage of the express optical fibers and the optical fibers of the drop cables and, in FTTC applications, the electrical conductors of an electrical feeder cable. Thus, a closure that includes the fiber management frame of the present invention may be serviced and reconfigured in a more efficient manner. Additionally, since the splice tray or connector panel may be accessed without accessing or otherwise working with other portions of the closure, the closure may be serviced or reconfigured in a manner that is less likely to damage the other portions of the closure.

BRIEF DESCRIPTION OF THE DRAWINGS

Figure 1:
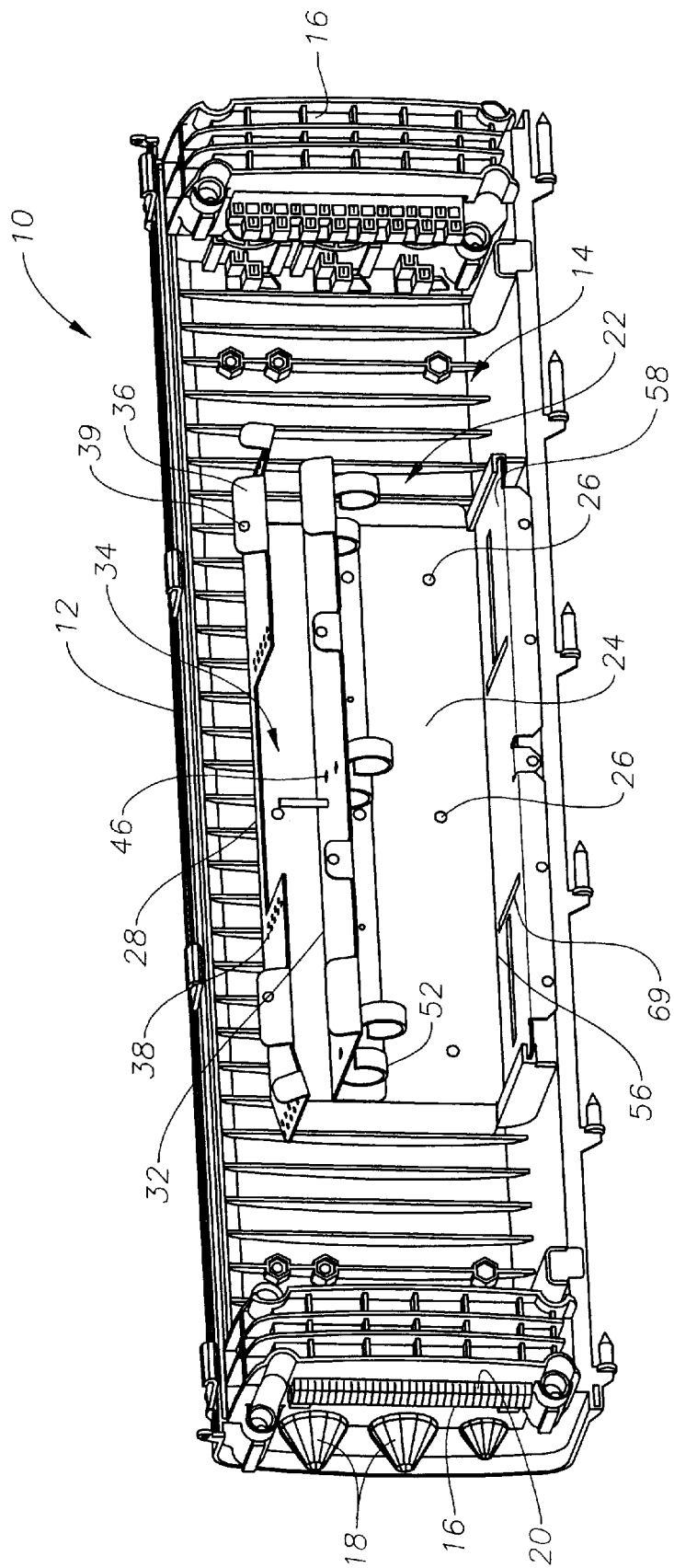
Figure 2:
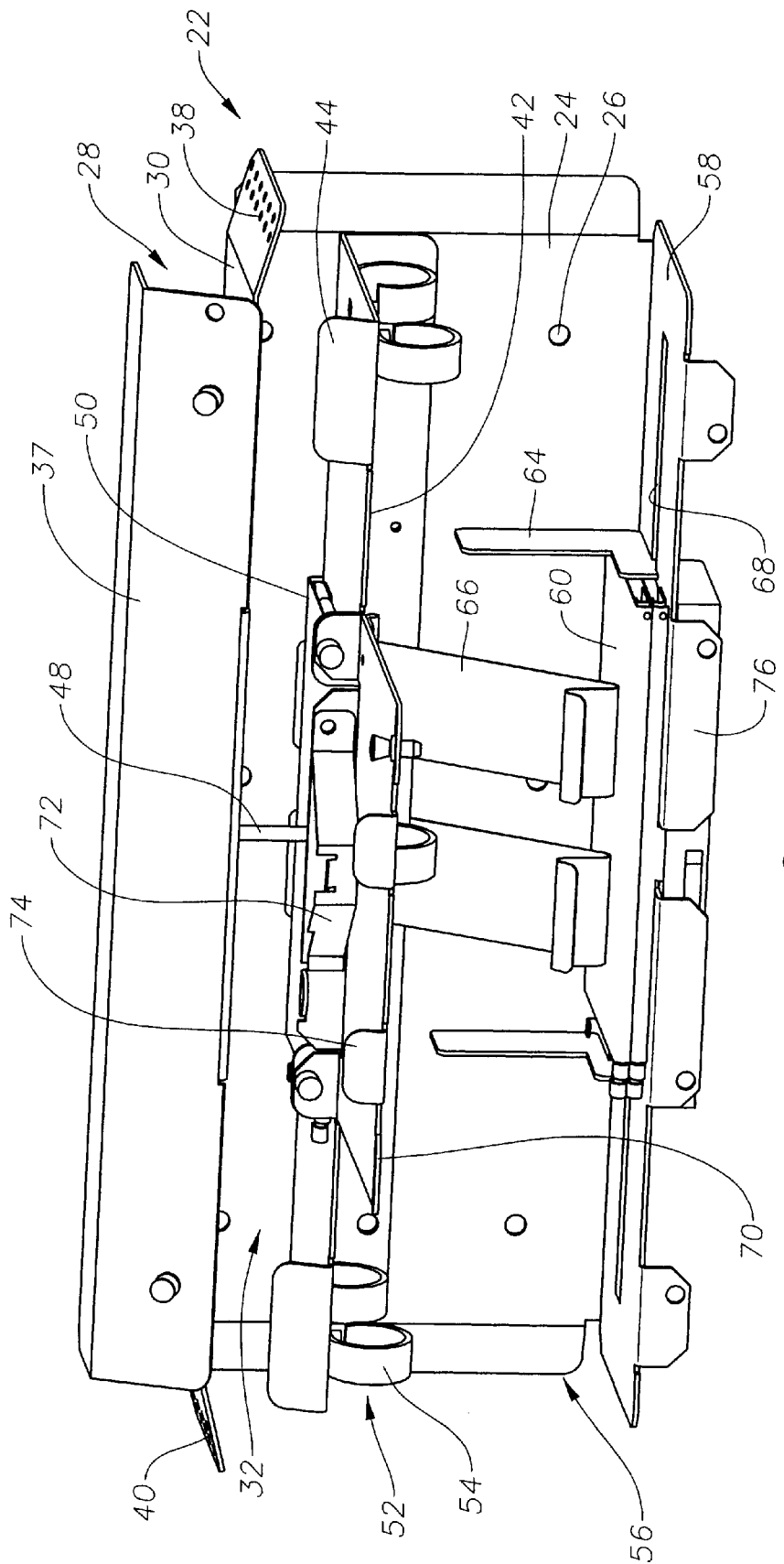
Figure 3:
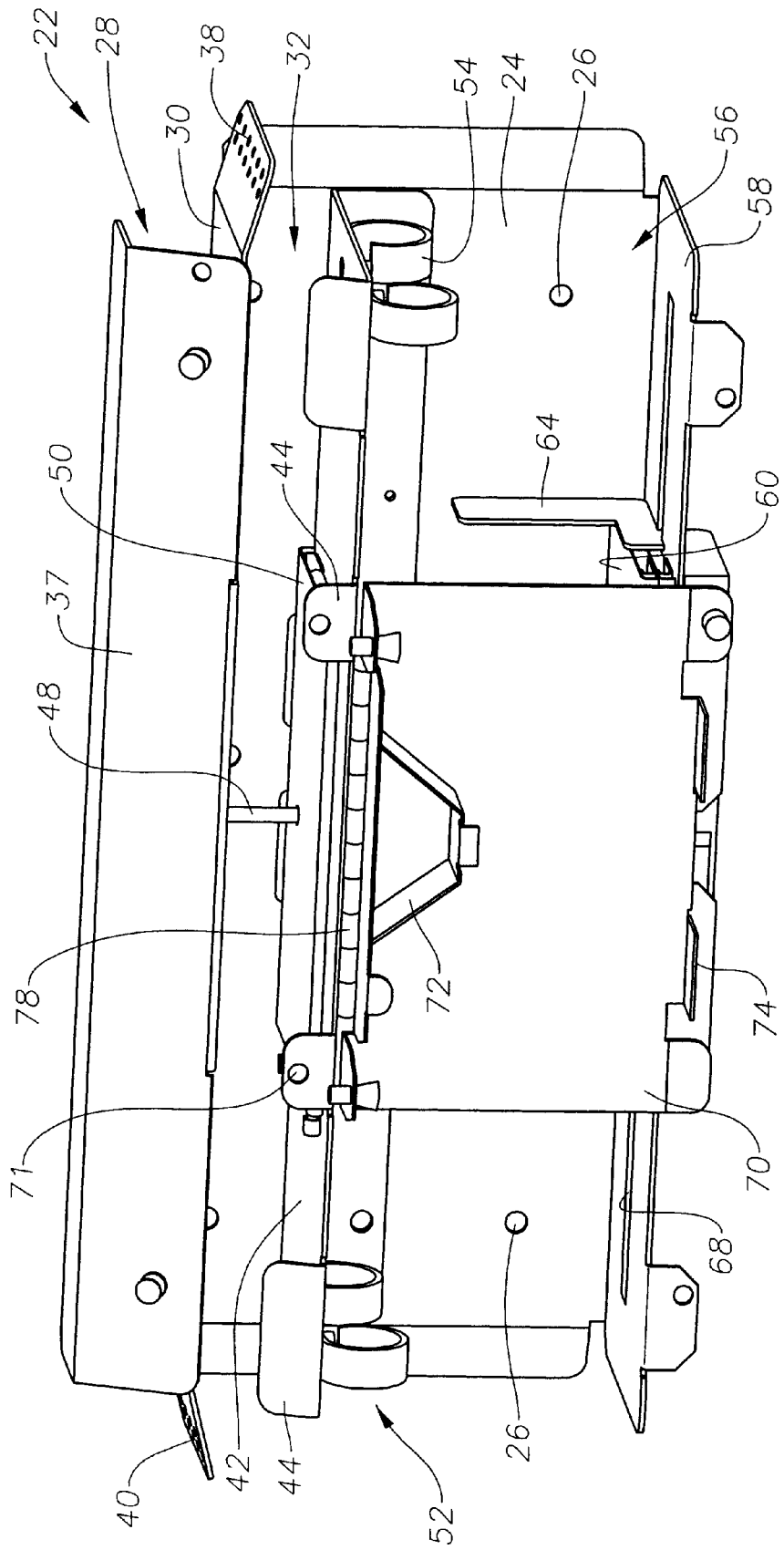
Figure 4:
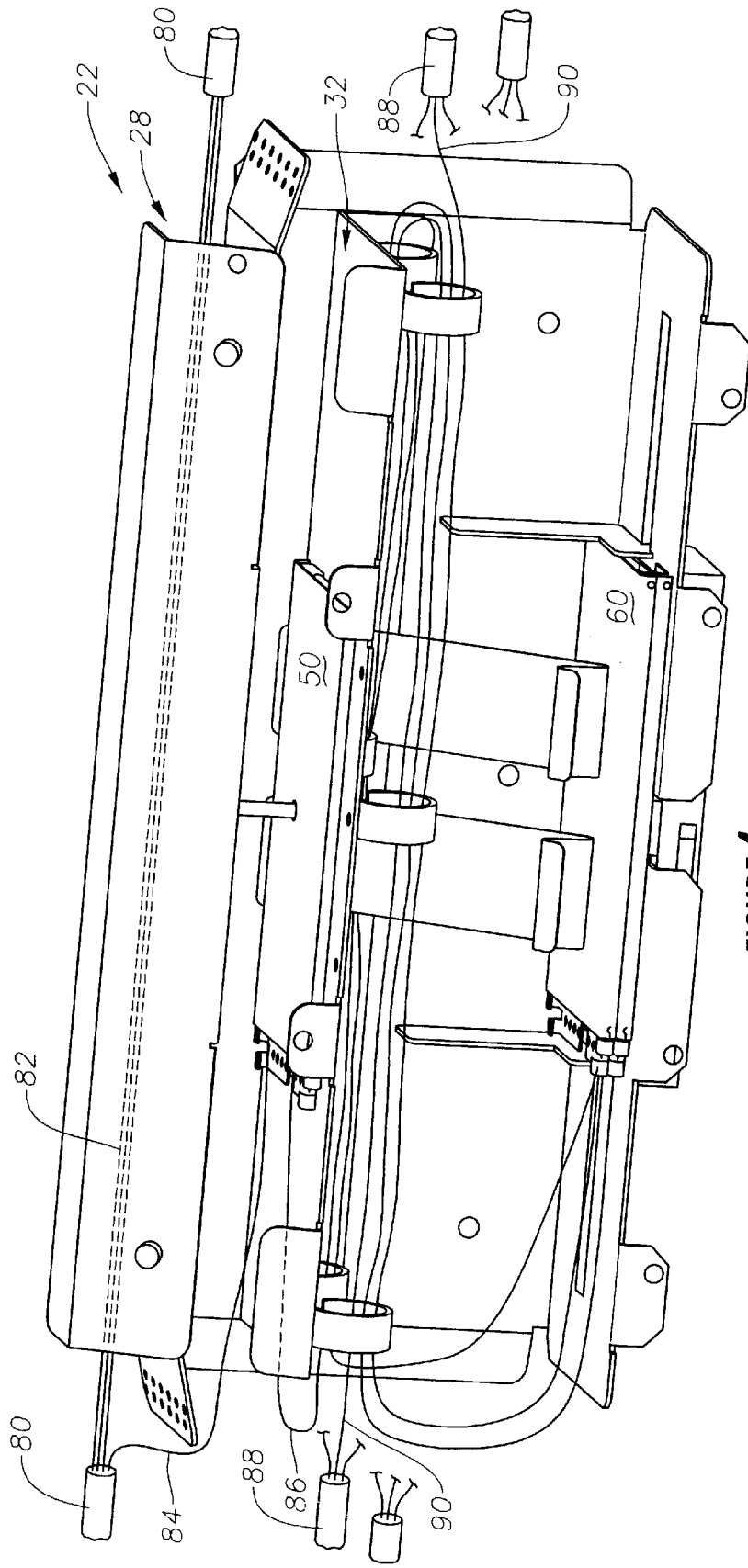
Figure 5:
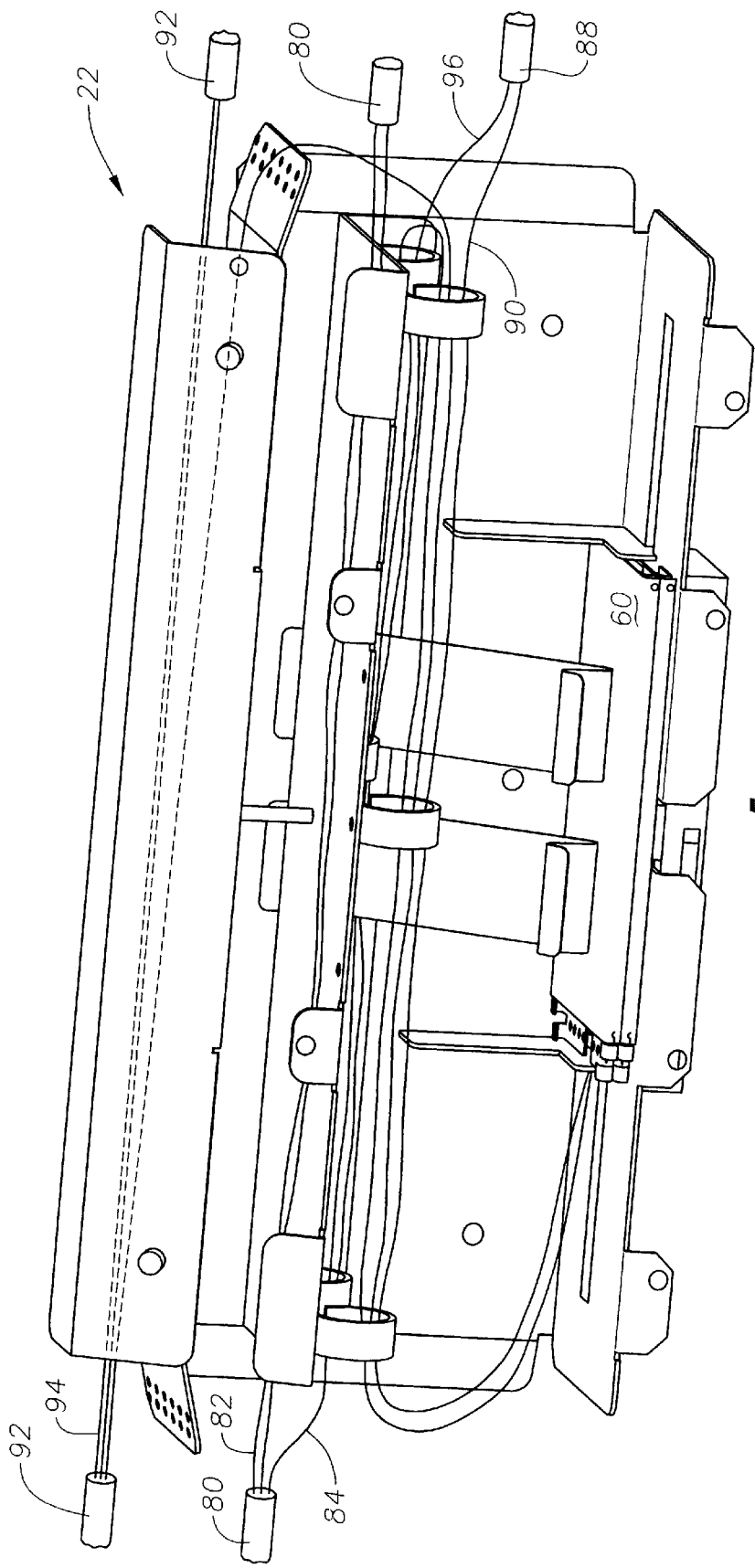

Having thus described the invention in general terms, reference will now be made to the accompanying drawings, which are not necessarily drawn to scale, and wherein:

FIG. 1 is a perspective view of a closure including a fiber management frame according to one embodiment of the present invention in which a portion of the housing of the closure has been removed in order to view the interior cavity defined by the closure and the fiber management frame disposed therein;

FIG. 2 is a perspective view of a fiber management frame according to one embodiment of the present invention which includes a coupler tray and a splice tray in separate compartments thereof and which includes a splicing platform in an extended position to facilitate configuration of the splice trays;

FIG. 3 is a perspective view of the fiber management frame of FIG. 2 in which the splicing platform has been folded down or stowed following configuration of the splice trays;

FIG. 4 is a perspective view of the fiber management frame of FIG. 2 in which the splicing platform has been removed for purposes of illustration and which depicts the routing of the express optical fibers and the optical fibers of the drop cables in FTTH applications; and FIG. 5 is a perspective view of the fiber management frame of FIG. 2 in which the splicing platform has been removed for purposes of illustration and which depicts the routing of the express electrical conductors, the express optical fibers and the optical fibers and electrical conductors of the drop cables in FTTC applications.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey of the invention to those skilled in the art. Like numbers refer to like elements throughout.

Referring now to FIG. 1, an optical fiber closure 10 according to one preferred embodiment of the present invention is illustrated. The closure 10 may be a splice closure, a patch closure or the like. For purposes of example and not of limitation, however, the closure 10 will be hereinafter described in terms of a splice closure. Furthermore, although the closure 10 is illustrated as an in-line closure, the closure 10 may have other configurations without departing from the spirit and the scope of the present invention.

As illustrated, the closure 10 includes a housing 12 defining an internal cavity 14. While the housing 12 may have a variety of shapes, the housing 12 is illustrated as being generally tubular with a substantially rectangular shape in lateral cross-section. The housing 12 extends lengthwise between a pair of opposed, open ends. The closure 10 also generally includes a pair of end caps 16 disposed within respective ones of the open ends of the housing 12 and secured to the housing 12, such as by means of an annular collar or other means known to those skilled in the art. While the housing 12 and the end caps 16 may be formed of a variety of materials, the housing 12 and the end caps 16 of one preferred embodiment are formed of a durable plastic.

As known to those skilled in the art and as shown in FIG. 1, the end caps 16 of the splice closure 10 generally define a plurality of ports for receiving respective cables. The ports defined by the end caps 16 may receive a fiber optic feeder cable that extends through the splice closure and the end portions of one or more fiber optic drop cables. While the end caps 16 may define a number of different types of ports, the end caps 16 of the illustrated embodiment include conically-shaped ports 18 for receiving and securely engaging a fiber optic feeder cable, an electrical feeder cable, and the like, and a seam 20 defined by a plurality of opposed, flexible fingers through which the drop cables extend. As such, in FTTH applications, one or more of the optical fibers of a fiber optic feeder cable may be spliced to respective optical fibers of the fiber optic drop cables within the closure 10, while the remaining optical fibers of the fiber optic feeder cable may extend uninterrupted through the closure 10. Additionally, in FTTC applications, the end caps 16 may define ports 18 for receiving an electrical feeder cable. Thus, one or more of the electrical conductors of the electrical feeder cable may also be spliced to corresponding electrical conductors of a drop cable, while the remaining electrical conductors of the electrical feeder cable extend uninterrupted through the closure 10. Accordingly, the drop cable in a FTTC application is typically a composite cable that includes both electrical conductors and optical fibers, as described further below. As will be apparent to those skilled in the art, however, the closure 10 and, more particularly, the end caps 16 may be configured to receive and interconnect other combinations of fiber optic and/or electrical cables, if so desired. In addition to receiving a variety of different types of cables, the closure 10 may organize and interconnect different types of optical fibers, such as loose buffered optical fibers and ribbon fiber. As such, the term "optical fiber" as used herein is intended to include all types of optical fibers, including loose buffered optical fibers, optical fibers in the form of a multi-fiber ribbon or any other type of optical fiber.

The closure 10 of the present invention also includes a fiber management frame 22 disposed within the internal cavity 14, as depicted in FIG. 1. The fiber management frame 22 includes a back panel 24 that is attached to the housing 12, such as by means of a plurality of bolts or other types of fasteners, that extend through corresponding apertures 26 defined by the back panel 24 of the fiber management frame 22 and engage the housing 12. As depicted, the fiber management frame 22 may be mounted within a medial portion of the housing 12. However, the fiber management frame 22 instead may be mounted closer to either end of the housing 12, if so desired. Additionally, while the fiber management frame 22 is depicted to extend lengthwise for about one-half of the length of the housing 12, the fiber management frame 22 may be either larger or smaller depending upon the size of the housing 12 and the requirements of the particular application. Typically, the fiber management frame 22 is formed of a metal, such as aluminum, although the fiber management frame 22 may be made of other materials, including durable plastic, if so desired.

The fiber management frame 22 includes a number of partitions for defining a plurality of compartments. In this regard, the fiber management frame 22 typically includes four compartments, each of which extends in a lengthwise direction so as to be in-line relative to the optical fibers and, in some instances, the electrical conductors that extend through the closure 10. In the illustrated embodiment, the fiber management frame 22 includes first, second, third and fourth compartments that extend side-by-side in a parallel fashion. The first compartment 28 includes a partition 30 that extends both outwardly from the back panel 24 and lengthwise through the closure 10. The partition 30 separates the first compartment 28 from the second compartment 32. However, the partition 30 may further define an opening or a cutout 34 to facilitate access to the second compartment 32 as described below. The first compartment 28 extends lengthwise from a first open end to a second open end. Thus, optical fibers or electrical conductors may extend lengthwise through the first compartment 28 as separately described below in conjunction with FTTH and FTTC applications, respectively.

To retain the optical fibers or the electrical conductors within the first compartment 28, the first compartment 28 may also include at least one and, more typically, a plurality of upturned flanges 36 spaced lengthwise along the outer edge of the partition 30 opposite the back panel 24. Additionally, the first compartment 28 may include a cover 37 for protecting the optical fibers or electrical conductors extending through the first compartment. Preferably, the cover 37 is removable and tethered to the fiber management frame 22. In the illustrated embodiment, for example, the cover 37 may be attached by means of a bolt or other type of fastener to the upturned flanges 36 and, in particular, to holes 39 defined by the upturned flanges 36. Thus, the cover 37 may be removed while the closure 10 is being configured to provide access to the first compartment 28. Conversely, the cover 37 may be installed following the configuration of the closure 10 to protect the optical fibers or electrical conductors.

Additionally, the partition 30 may define a plurality of holes 38 for receiving tie wraps or other types of fasteners. As such, the tie wraps or other types of fasteners may be wrapped about the optical fibers or the electrical connectors and extended through at least a pair of the holes 38 defined by the partition 30 to secure the optical fibers or the electrical conductors to the partition 30. As depicted, the partition 30 may define holes 38 at various locations, including locations proximate the opposed open ends of the first compartment 28.

In one embodiment, the first compartment 28 also includes an angled ramp 40 projecting outwardly from at least one end and, more typically, both ends of the partition 30. As depicted, the angled ramp 40 generally slopes slightly downward towards the second compartment 32 so as to assist in guiding the optical fibers or the electrical conductors from a respective port and into the first compartment 28. As also shown, the angled ramp 40 may define a plurality of the holes 38 through which tie wraps or other types of fasteners may extend in order to secure the optical fibers or the electrical conductors to the partition 30.

The second compartment 32 also includes a partition 42 extending both outwardly from the back panel 24 and in a lengthwise direction. As depicted, the partition 42 of the second compartment 32 is spaced somewhat from the partition 30 of the first compartment 28 to thereby define the second compartment 32 therebetween. The second compartment 32 also extends in a lengthwise direction from a first end to a second end. Typically, each end is open for receiving optical fibers. However, in FTTH applications, optical fibers typically only pass through.the first end of the second compartment 32 such that only the first end need be open. In order to permit the fiber management frame 22 to be used universally in both FTTH and FTTC applications, however, the fiber management frame 22 is preferably designed such that both the first and second ends of the second compartment 32 are open. Like the first compartment 28, the second compartment 32 also preferably includes at least one and, more typically, a plurality of upturned flanges 44 spaced lengthwise along the edge of the partition 42 opposite the back panel 24 for retaining the optical fibers within the second compartment 32. Moreover, the partition 42 of the second compartment 32 may define a plurality of holes 46 for receiving tie wraps or other types of fasteners in order to secure the optical fibers to the partition 42 of the second compartment 32 as described above in conjunction with the first compartment 28. As described in more detail below in conjunction with the FTTH application, the second compartment 32 may also include an engagement member 48, such as an upstanding threaded peg and wing nut, for engaging and securing at least one coupler tray 50 that may be stored in the second compartment 32.

The third compartment 52 is proximate the second compartment 32 and also extends in a lengthwise direction from a first open end to a second open end. Thus, the third compartment 52 may receive optical fibers, such as the optical fibers of a drop cable, through both the first and second ends; The third compartment 52 is designed to store slack lengths of optical fibers, including the optical fibers of the drop cables and the optical fibers of the fiber optic feeder cable. In the illustrated embodiment, the third compartment 52 includes a plurality of retainers 54. The plurality of retainers 54 are preferably connected to the partition 42 of the second compartment 32. Typically, the retainers 54 are arranged in one or more lengthwise extending rows. In the illustrated embodiment, for example, the retainers 54 are disposed in two lengthwise extending rows. The retainers 54 are preferably spaced apart in a lengthwise direction to adequately support the optical fibers. The retainers 54 of the illustrated embodiment are open rings to permit optical fibers to be inserted into and removed from the rings, although the retainers 54 may have other configurations, if so desired. While the third compartment 52 of the illustrated embodiment includes a plurality of retainers 54 for retaining optical fibers that extend therethrough, the third compartment 52 may, instead, be formed in other manners, such as by means of another partition extending both outwardly from the back panel 24 and in a lengthwise.direction. In this alternative embodiment, the partition of the third compartment 52 would be spaced from the partition 42 of the second compartment 32 so as to define a region between the partitions of the second compartment 32 and third compartment 52 through which the optical fibers may extend.

The fourth compartment 56 of the fiber management frame 22 is proximate the third compartment 52 in the illustrated embodiment. The fourth compartment 56 also includes a partition 58 that extends both outwardly from the back panel 24 and in a lengthwise direction. Typically, the fourth compartment 56 extends lengthwise between a first open end and a second open end. Since the optical fibers typically only enter and exit the fourth compartment 56 from one end, however, the other end of the fourth compartment 56 could be closed, if so desired. In both FTTH and FTTC applications, the fourth compartment 56 is advantageously designed to store at least one splice tray 60 or at least one connector panel, or both. As such, optical fibers of a fiber optic feeder cable may be interconnected with corresponding optical fibers of one or more drop cables within the splice tray 60 and/or connector panel stored within the fourth compartment 56. By being capable of storing a splice tray 60 and/or a connector panel, the fiber management frame 22 of the present invention provides a common platform so as to reduce the number of different types of closures that must be manufactured and installed.

The fourth compartment 56 may therefore also include an engagement member for engaging one or more splice trays 60 and/or one or more connector panels. While the engagement member may be an upstanding peg as described above in conjunction with the engagement member 48 of the second compartment 32, the engagement member of the fourth compartment 56 may include both a pair of adjuster brackets 64 and one or more tensioners 66. In this regard, the partition 58 of the fourth compartment 56 may define a pair of lengthwise extending openings 68, one of which is proximate each end of the fourth compartment 56. The engagement member of the fourth compartment 56 may therefore include a pair of adjuster brackets 64 that are slidably engaged within corresponding ones of the lengthwise extending grooves. Thus, the adjuster brackets 64 may be slid inwardly along the respective grooves until the adjuster brackets 64 contact the opposed ends of the splice trays 60 or connector panels. By permitting the adjuster brackets 64 to move in a lengthwise direction, the fourth compartment 56 may therefore accommodate splice trays 60 or connector panels of different sizes. The adjuster brackets 64 are also removable for future or custom applications.

The engagement member of the fourth compartment 56 of this embodiment also includes at least one and, more typically, a pair of tensioners 66 that engage the upper surface of the splice trays 60 or connector panels (i.e., the surface opposite the partition 58 of the fourth compartment 56). The tensioners 66 apply a bias force to urge the splice trays 60 or connector panels toward the partition, thereby securing the splice trays or connector panels within the fourth compartment 56. Typically, the tensioners 66 extend downwardly from the partition 42 of the second compartment 32. However, the tensioners 66 may extend from the back panel 24 or other portions of the fiber management frame 22, if so desired. The tensioners 66 of one embodiment are formed of spring steel. However, the tensioners 66 may also be formed of other materials capable of applying the bias force, if so desired.

As depicted in FIG. 1, the partition 58 of the fourth compartment 56 may also define a pair of slots 69 that extend in a lateral direction. The slots 69 engage corresponding portions of a connector panel in order to facilitate the connector panel being slidably inserted and removed from the fourth compartment 56, thereby providing a field technician with greater access to the connectors.

While a fiber management frame 22 of one advantageous embodiment has been illustrated and described, the fiber management frame 22 may have other configurations, if so desired. For example, the various compartments may have different heights and widths. Additionally, the compartments may be oriented differently with the fourth compartment 56 being the topmost compartment and the first compartment 28 being the lowermost compartment. However, the fiber management frame 22 preferably defines the compartments to be in-line with the feeder and drop cables to facilitate the routing of the optical fibers and, in FTTC applications, electrical conductors.

In order to facilitate the splicing of the optical fibers within the splice tray 60, the fiber management frame 22 may also include a splicing platform 70 for holding a splice tray 60 during splicing operations. As shown in FIG. 2, during splicing operations the splicing platform 70 may be placed in an operative position so as to extend outwardly from other portions of the fiber management frame 22. For example, the splicing platform 70 may be connected to one or more of the upturned flanges 44 of the second compartment 32 and may extend outwardly from the partition 42 of the second compartment 32; typically in approximately the same plane as defined by the partition 42 of the second compartment 32. In this regard, the splicing platform 70 of one embodiment may be connected to the upturned flanges 44 by means of bolts or other fasteners that extend through corresponding holes 71 defined by the flanges 44.

Once the splicing platform 70 has been placed in the operative position, a splice tray 60 may be mounted upon the splicing platform 70 with the cover of the splice tray 60 having been removed. Typically, the splicing platform 70 engages and holds the splice tray 60 in position. In this regard, the splicing platform 70 may include a bias member 72, such as a leaf spring or the like, for engaging one side of the splice tray 60 and for urging the splice tray 60 outwardly therefrom. In addition, the splicing platform 70 may include one or more upturned flanges 74 along the opposite edge of the splicing platform 70, (i.e., the outer edge of the splicing platform 70) for engaging the opposite side of the splice tray 60. As such, the bias member 72 urges the splice tray 60 outwardly into contact with the upturned flanges 74, thereby securing the splice tray 60 upon the splicing platform 70.

Once the spliced connections have been established, the splice tray 60 may be removed from the splicing platform 70 and the cover of the splice tray 60 reinstalled. The splice tray 60 may then be positioned within the fourth compartment 56. The splicing platform 70 is then stowed as shown in FIG. 3. In this regard, the splicing platform 70 is disconnected from the upturned flanges 44 of the second compartment 32 and is rotated downwardly through approximately 90°. The outer edge of this splicing platform 70 may then be connected to one or more flanges 76 that are connected to and depend from the partition 58 of the fourth compartment 56. In order to facilitate the rotation, the splicing platform 70 may also be connected in the fiber management frame 22 and, in particular, to the partition 42 of the second compartment 32, by means of a hinge 78, as also depicted in FIG. 3.

As such, the splicing platform 70 may facilitate the splicing of optical fibers of the fiber optic feeder cable and the fiber optic drop cables while in the operative position depicted in FIG. 2. Once the splicing has been completed, however, the splicing platform 70 may be folded away so as not to create an obstruction within the closure 10. Moreover, once the splicing platform 70 has been stored as depicted in FIG. 3, the splicing platform 70 actually serves to protect and secure the splice trays 60 and/or connector panels by at least partially covering the spice trays 60 and/or connector panels mounted within the fourth compartment 56.

The fiber management frame 22 of the present invention may advantageously be utilized in either FTTH or FTTC applications. As such, the configuration of the fiber management frame 22 in each of these applications is hereinafter described. In a FTTH application, a fiber optic feeder cable extends through the closure 10 with one or more of the optical fibers of the fiber optic feeder cable being split from the fiber optic feeder cable and spliced or otherwise interconnected with corresponding optical fibers of one or more fiber optic drop cables. The fiber optic drop cables then exit the closure and are routed to a home, business or the like.

In a FTTH application as shown in FIG. 4, the optical fibers of the fiber optic feeder cable 80 enter the closure 10 through a respective port 18 defined by one end cap 16 and are split into two groups, the first group of the optical fibers being express fibers 82 that extend uninterrupted through the closure 10. These express fibers extend through the first compartment 28 of the fiber management frame 22 and typically exit the closure 10 through a respective port defined by the opposite end cap 16. The other optical fibers 84 of the fiber optic feeder cable that are split from the express fibers are directed to the second compartment 32 stile the optical fibers of the fiber optic feeder cable may be split in a variety of manners, the optical fibers are preferably split by means of a taut-sheath splitter, as described in more detail in U.S. patent application Ser. No. 09/725,521 entitled "Apparatus and Method For Splitting Optical Firers," which issued Oct. 15, 2002 as U.S. Pat. No. 6,466,725, and is assigned to the assignee of the present invention, the disclosure of which is expressly incorporated herein.

In the FTTH application, one or more coupler trays 50 are typically stored within the second compartment 32. In this regard, each coupler tray 50 preferably defines an aperture through a medial portion thereof. As such, each coupler tray 50 may be positioned within the second compartment 32 such that the engagement member 48 of the second compartment 32 extends through the aperture and engages the coupler tray 50. The optical fibers 84 of the fiber optic feeder cable 80 that have been split from the express fibers 82 are typically routed to the coupler tray 50. As known to those skilled in the art, optical fibers 84 that are input into a coupler tray 50 are split, typically two, three, four or more ways. Thus, a first optical fiber 84 that enters a coupler tray 50 is generally split into a plurality of second optical fibers 86. The second optical fibers 86 emerging from the coupler tray 50 are then routed to the third compartment 52. Once in the third compartment 52, the second optical fibers 86 preferably are looped one or more times therethrough to provide slack lengths of the second optical fibers 86. The second optical fibers 86 then emerge from the third compartment 52 and are routed to the fourth compartment 56 and into a splice tray 60 and/or a connector panel in a known manner.

In a FTTH application, the closure 10 also receives the end portions of one or more fiber optic drop cables 88. The optical fibers 90 of the fiber optic drop cables 88 are also directed to the third compartment 52 through which the optical fibers 90 are looped one or more times in order to provide slack lengths of the optical fibers 90 of the fiber optic drop cables 88. The optical fibers 90 of the fiber optic drop cables 88 then exit the third compartment 52 and are directed to the fourth compartment 56. Once in the fourth compartment 56, the optical fibers 90 of the fiber optic drop cables 88 are directed into the splice tray 60 and/or connector panel and are interconnected with corresponding optical fibers 86 from the coupler tray 50. One or more splice trays and/or connector panels could be used concurrently. The splice trays 60 could be used for an application with a lower loss budget, such as fiber-to-the-business, while the connector panel is used for FTTH, which may allow more loss. Another option is to use the splice trays 60 to splice a pigtail onto the feeder and/or drop cable fibers. The pigtail would then be routed to the connector panel using the third compartment 52. As such, optical fibers 84 from the fiber optic feeder cable 80 may be interconnected with corresponding optical fibers 90 of a fiber optic drop cable 88. The fiber optic drop cable 88 then exits the closure 10 and extends to a home, business or the like.

In a FTTC application as shown in FIG. 5, the closure 10 not only receives a fiber optic feeder cable 80, but also receives an electrical feeder cable 92 having a plurality of electrical conductors 94, typically twisted pairs of copper conductors. The closure 10 also receives the end portions of one or more composite drop cables 88. While separate drop cables could be utilized for both the optical fibers 90 and the electrical conductors 96, a common composite drop cable that includes both optical fibers 90 and electrical conductors 96 is typically utilized. Thus, at least some of the electrical conductors 94 of the electrical feeder cable 92 and at least some of the optical fibers 84 of the fiber optic feeder cable 80 may be spliced to corresponding electrical conductors 96 and optical fibers 90 of the composite drop cable 88. The composite drop cable 88 may then extend from the curb toward a home, business or the like. Typically, the composite drop cable 88 extends to a node, such as an optical network unit, which converts the optical signals to corresponding electrical signals for transmission to the home, the business or the like.

In FTTC applications, the electrical conductors 94 of the electrical feeder cable 92 extend through the first compartment 28 of the fiber management frame 22. A number of the electrical conductors 94 typically extend uninterrupted through the first compartment 28. However, one or more of the electrical conductors 94 are typically spliced to corresponding electrical conductors 96 of the drop cable 88. This splice is performed in the first compartment 28 as designated by an X in FIG. 5 and in a manner known to those skilled in the art. In this application, the optical fibers 84 of the fiber optic feeder cable 80 are again split with the express fibers 82 that extend uninterrupted through the closure 10 extending through the second compartment 32 of the fiber management frame 22. As such, in this application, the second compartment 32 does not include the coupler tray 50, but instead, defines a passageway through which the express fibers of the fiber optic feeder cable 80 extend. The optical fibers 84 of the fiber optic feeder cable 80 that are split from the express fibers and are to be spliced to corresponding optical fibers 90 of the composite drop cable 88 are routed directly to the third compartment 52. As described above in conjunction with the FTTH application, the optical fibers 84 are then looped through the third compartment 52 to store slack lengths of the optical fibers 84 prior to being directed to the fourth compartment 56 and into a splice tray 60 and/or connector panel. Within the splice tray 60 and/or connector panel, the optical fibers 84 of the fiber optic feeder cable 80 are interconnected to corresponding optical fibers 90 of the composite drop cable 88. As described above, the optical fibers 90 of the composite drop cable 88 are also preferably looped through the third compartment 52 prior to being directed into the fourth compartment 56 to provide slack lengths of the optical fibers 90.

In either application, the splicing may be performed while the splice tray 60 is held by the splicing platform 68. See FIG. 2. Once the appropriate interconnections have been established, the splicing platform 68 is stowed as depicted in FIG. 3 and the cover 37 of the first compartment 28 is installed. In this regard, the cover 37 is typically attached to one or more of the upstanding flanges 36 of the first compartment 28 so as to extend at least partially over and thereby protect the express optical fibers 82 or electrical conductors 94 disposed within the first compartment 28.

As described above, various optical fibers are stored and routed by the fiber management frame 22 in both FTTH and FTTC applications. While the optical fibers themselves may extend through the closure 10, the optical fibers are typically disposed in buffer tubes or transport tubes to further protect the optical fibers. Although not depicted in FIGS. 4 and 5, the optical fibers 84 of the fiber optic feeder cable 80 and the second optical fibers 86 extending from the coupler tray 50 to the splice tray 60 and/or connector panel are typically disposed in transport tubes, while the optical fibers 90 of the drop cables 88 are typically disposed in buffer tubes for added protection.

Once the optical fibers and any electrical conductors have been appropriately routed and connected, the housing 12 may be assembled and the splice closure 10 placed into service. As a result of the organization provided by the fiber management frame 22, subsequent service and reconfiguration of the optical fibers and/or electrical conductors is simplified. In this regard, a field technician may readily access the splice trays 60 and/or connector panels to splice additional optical fibers or.to change the splice connections without having to access or otherwise work with the express optical fibers 82 or the coupler tray 50 or, in FTTC applications, the electrical conductors 94. Similarly, a field technician may establish additional spliced connections for the electrical conductors 94 in a FTTC application without having to access or otherwise work with any of the express optical fibers 82, 84, 86. Thus, the technician may efficiently service and reconfigure the interconnections provided within the closure 10 in a manner that is much less likely to inadvertently damage other aspects of the closure 10. Moreover, the fiber management frame 22 of the present invention permits a common closure 10 to be utilized in both FTTH and FTTC applications, thereby advantageously reducing the number of different types of closures that must be manufactured and maintained in stock and the number of different types of closures with which a field technician must be familiar.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A fiber management frame disposed within a closure that is adapted to interconnect a fiber optic feeder cable and at least one fiber optic drop cable, the fiber management frame comprising:

a first compartment for receiving express optical fibers of the fiber optic feeder cable that extend uninterrupted through the closure;

a second compartment, proximate the first compartment, comprising at least one coupler tray that is adapted to split a first optical fiber of the fiber optic feeder cable into a plurality of second optical fibers;

a third compartment for storing slack lengths of the at least one fiber optic drop cable; and a fourth compartment, proximate the third compartment, comprising at least one of a splice tray and a connector panel that is adapted to interconnect at least one of the second optical fibers to a respective optical fiber of the at least one fiber optic drop cable.

2. A fiber management frame according to claim 1 wherein the first compartment comprises a cover for protecting the express optical fibers extending through the first compartment.

3. A fiber management frame according to claim 1 wherein the first compartment comprises an angled ramp projecting outwardly from at least one end for guiding the express optical fibers through the first compartment.

4. A fiber management frame according to claim 1 wherein the first compartment comprises a partition that separates the first compartment and the second compartment, and wherein the partition defines an opening to facilitate access to the second compartment.

5. A fiber management frame according to claim 1 comprising a back panel, wherein the first compartment and the second compartment each comprise a partition that extends outwardly from the back panel and at least one upturned flange on an edge of the partition opposite the back panel.

6. A fiber management frame according to claim 1 wherein the second compartment comprises a partition that separates the second compartment and the third compartment, and wherein the third compartment comprises a plurality of retainers attached to the partition of the second compartment for retaining slack lengths of the at least one fiber optic drop cable.

7. A fiber management frame according to claim 1 wherein the second compartment comprises an engagement member for engaging at least one coupler tray.

8. A fiber management frame disposed within a closure that is adapted to interconnect a fiber optic feeder cable, at least one drop cable and an electrical feeder cable, the fiber management frame comprising:

a first compartment receiving at least one electrical conductor of the electrical feeder cable;

a second compartment receiving express optical fibers of the fiber optic feeder cable that extend uninterrupted through the closure, a third compartment storing slack lengths of the at least one drop cable; and a fourth compartment, proximate the third compartment, comprising at least one of a coupler tray, a splice tray and a connector panel that is adapted to interconnect an optical fiber of the fiber optic feeder cable and a respective optical fiber of the at least one drop cable.

9. A fiber management frame according to claim 8 wherein the first compartment comprises a cover for protecting the at least one electrical conductor extending through the first compartment.

10. A fiber management frame according to claim 8 wherein the first compartment comprises an angled ramp projecting outwardly from at least one end for guiding the at least one electrical conductor through the first compartment.

11. A fiber management frame according to claim 8 wherein the first compartment comprises a partition that separates the first compartment and the second compartment.

12. A fiber management frame according to claim 8 comprising a back panel, wherein the first compartment and the second compartment each comprise a partition that extends outwardly from the back panel and at least one upturned flange on an edge of the partition opposite the back panel.

13. A fiber management frame according to claim 8 wherein the second compartment comprises a partition that separates the second compartment and the third compartment, and wherein the third compartment comprises a plurality of retainers attached to the partition of the second compartment for retaining slack lengths of the at least one drop cable.

14. A closure comprising:

a housing defining a lengthwise extending internal cavity and further defining a plurality of ports opening into the internal cavity for receiving a plurality of cables; and a fiber management frame disposed within the internal cavity defined by the housing, the fiber management Same comprising:

a back panel attached to the housing;

a first compartment comprising a first partition that extends both outwardly from the back panel and in the lengthwise direction, the first compartment extending lengthwise from a first open end to a second open end thereof;

a second compartment, proximate the first compartment, comprising a second partition that is spaced apart from the first partition and that extends both outwardly from the back panel and in the lengthwise direction, the second compartment defining at least a first open end thereof and comprising at least one coupler tray that is adapted to split a first optical fiber into a plurality of second optical fibers;

a third compartment that extends in the lengthwise direction alongside the second compartment from at least a first open end thereof; and a fourth compartment, proximate the third compartment, comprising a third partition that is spaced apart from the first partition and the second partition and that extends both outwardly from the back panel and in the lengthwise direction, the fourth compartment defining at least a first open end thereof and comprising at least one of a splice tray and a connector panel that is adapted to interconnect at least one of the second optical fibers to an optical fiber of a fiber optic drop cable.

15. A closure according to claim 14 wherein the first compartment of the fiber management frame comprises a cover.

16. A closure according to claim 14 wherein the first compartment of the fiber management frame comprises an angled ramp projecting outwardly from at least one end.

17. A closure according to claim 14 wherein the first partition of the fiber management frame defines an opening to facilitate access to the second compartment.

18. A closure according to claim 14 wherein the first compartment and the second compartment each comprise at least one upturned flange on an edge of the first partition and the second partition, respectively, opposite the back panel.

19. A closure according to claim 14 wherein the third compartment of the fiber management frame comprises a plurality of retainers attached to the second partition.

* * * * *

UNITED STATES PATENT AND TRADEMARK OFFICE
CERTIFICATE OF CORRECTION

PATENT NO. : 6,560,394 B1
DATED : May 6, 2003
INVENTOR(S) : Jennifer A. Battey and Steve A. Fontaine It is certified that error appears in the above-identified patent and that said Letters Patent is hereby corrected as shown below:

<u>Title page,</u>
Item [57], ABSTRACT,
Line 19, delete "." after "slack".

<u>Column 14,</u>
Line 21, delete "Same", add -- frame --.

Signed and Sealed this

Twenty-sixth Day of August, 2003

JAMES E. ROGAN
*Director of the United States Patent and Trademark Office*